Oct. 25, 1966  W. P. SPALDING  3,280,945
TREAD BRAKE ASSEMBLY

Filed Nov. 9, 1964  3 Sheets-Sheet 1

INVENTOR.
WILLARD P. SPALDING
BY
*A. A. Steinmiller*
ATTORNEY

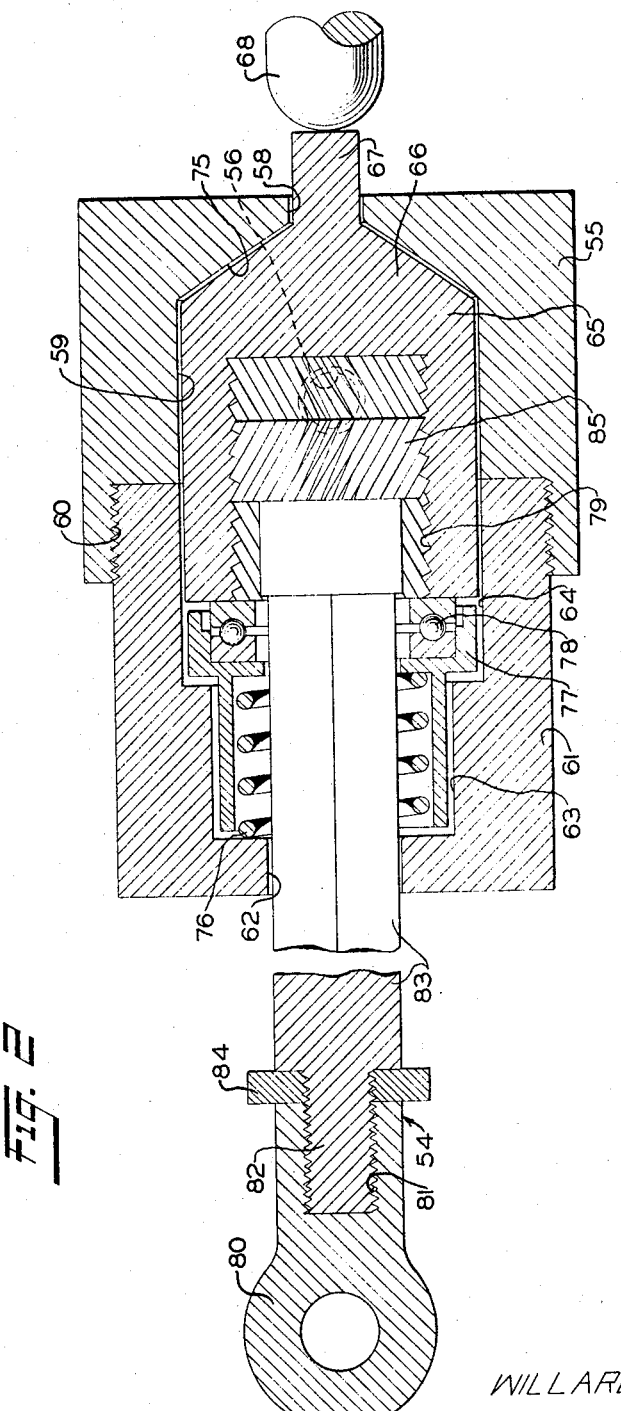

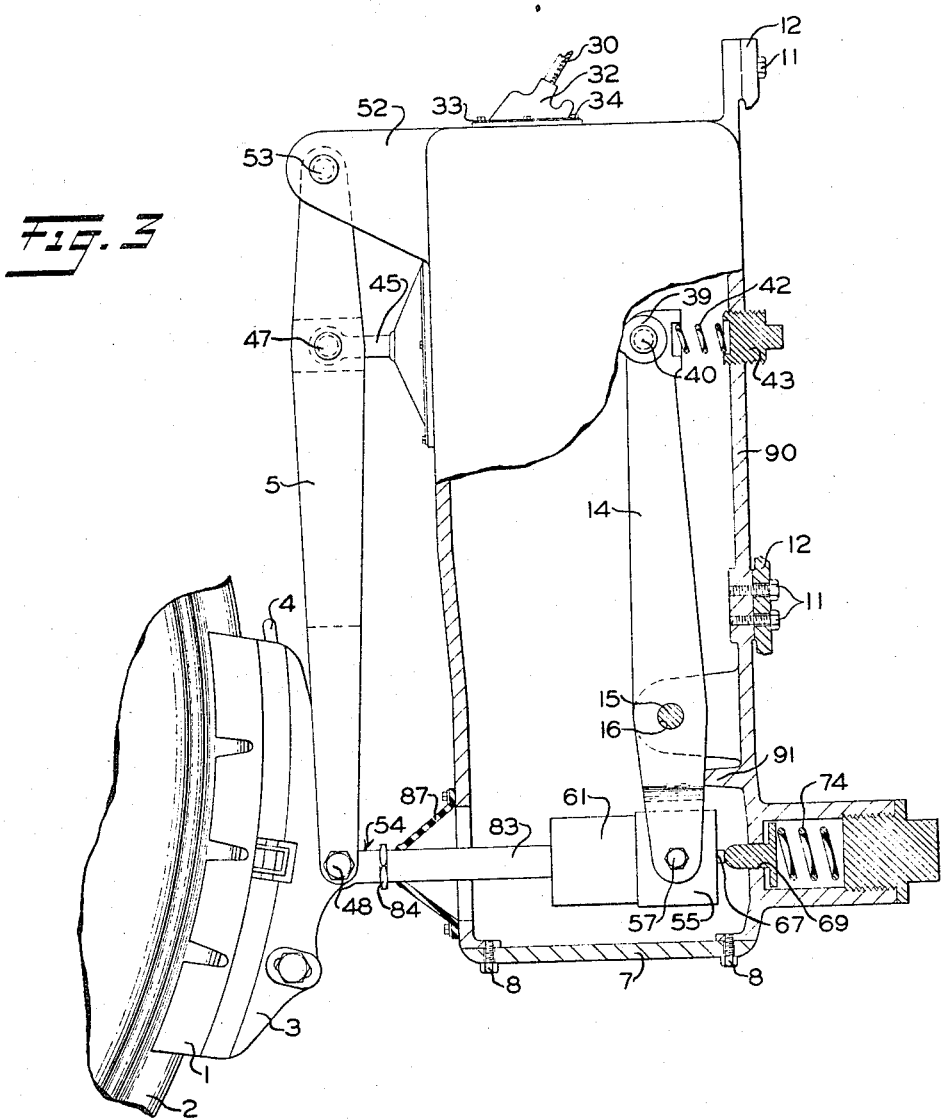

3,280,945
Patented Oct. 25, 1966

United States Patent Office 3,280,945
TREAD BRAKE ASSEMBLY
Willard P. Spalding, Verona, Pa., assignor to Westinghouse Air Brake Company, Wilmerding, Pa., a corporation of Pennsylvania
Filed Nov. 9, 1964, Ser. No. 409,823
11 Claims. (Cl. 188—202)

This invention relates to tread brake apparatus for railway rolling stock, and, more particularly, to tread brake apparatus of the "package" type wherein the entire mechanism is self-contained and installable and removable as a unit on the truck frame.

Until recently, conventional brake riggings for railway cars consisted of one or more brake cylinders carried on the underside of the car body and having the piston rods thereof connected through rods and levers to the brake shoes, independently hung on brake shoe hangers from the truck frame, to effect movement of all of the brake shoes on the car into and out of contact with the tread of the car truck wheels.

The conventional type of brake rigging cannot conveniently be employed on certain new type cars, such as the new lightweight cars, due to limitations of space and weight requirements. Consequently, more recently there has been proposed for use on railway cars, such as subway cars, a brake rigging of the package type wherein a self-contained brake assembly is provided for each individual wheel on the car. A brake assembly of this type is described and claimed in Patent No. 2,940,554, issued June 14, 1960 to Mortimer B. Cameron and assigned to the assignee of this application.

The brake assembly described in the Cameron patent is provided with a slack adjuster mechanism between a brake lever and a brake shoe actuating rod for compensating for brake shoe wear. The brake shoe actuating rod comprises a nonrotative screw member and an internally threaded sleeve member rotated on the nonrotative screw member by a pawl and ratchet wheel in response to more than a chosen degree of angular rocking of a brake lever operatively connected to the pawl to thereby increase the length of the brake shoe actuating rod as the brake shoe wears.

It has been found that package brake assemblies are subject during winter weather to the collection of ice and snow which interferes with the proper movement of the brake shoe into direct frictional contact with the tread of the wheel, thereby, in some instances, interfering with a quick and full brake application when desired.

One method that has been tried on certain railroads to prevent the collection of ice and snow on brake assemblies of the package type has been to maintain a sufficiently low fluid pressure in the brake cylinder so that a light brake application is in effect while the train is traveling along the track without exerting an appreciable retarding or braking force, the purpose of the light brake application being to generate, by the friction of the brake shoe against the tread surface of its corresponding wheel, sufficient heat to produce a rise in the temperature of the brake shoe and the peripheral portion of its corresponding wheel to such a temperature as to prevent the accumulation of ice and snow thereon. However, it has been found in actual practice that the small degree of pressure required in the brake cylinder of the package type brake assembly necessary to press the brake shoe against the tread surface of its corresponding wheel with sufficient force to generate the required amount of heat to prevent the accumulation of ice and snow on the brake shoe and wheel is not sufficient to press the periphery or skirt portion of the packing cup that is secured to the piston of the brake cylinder against the wall of the bore in the brake cylinder with the degree of force necessary to effect a fluid pressure seal between the skirt portion and the wall of the bore. Consequently, a considerable quantity of fluid under pressure leaks past the skirt portion of the packing cup so that the pressures on the opposite sides of the piston tend to equalize and thus create a condition which, it is apparent, is most undesirable, for, upon equalization, the brake shoe is no longer pressed against its corresponding wheel for the purpose of generating heat to prevent the accumulation of ice and snow thereon.

Accordingly, it is the general purpose of this invention to provide a novel package type wheel tread brake assembly that may or may not include a "snow brake" in the form of a biasing or spring means for constantly pressing a brake shoe against the tread surface of a corresponding wheel with a light force of such magnitude as to generate sufficient heat to prevent the accumulation of ice and snow thereon. This brake assembly further includes a novel slack adjuster mechanism that is operable in conjunction with the "snow brake" spring means to adjust or increase the length of a brake shoe actuating rod, in accordance with brake shoe wear occurring while a brake application is in effect, upon effecting a subsequent brake release, or is operable, in the absence of the snow brake spring means, to adjust or increase the length of the brake shoe actuating rod in accordance with previous brake shoe wear or the present shoe thickness each time a brake application is effected and thereafter restore it to its original length upon effecting a subsequent brake release.

When used, the snow brake spring means is effective independently of and without fluid under pressure present in a brake cylinder device, to press the brake shoe of the brake assembly against the tread surface of its corresponding wheel with a light force which is adequate to generate sufficient heat to produce a rise in the temperature of the brake shoe and the tread surface of its corresponding wheel to such a temperature as to prevent the accumulation of ice and snow thereon and thereby insure the obtaining of a proper brake operation when called for.

The biasing or spring means for pressing the brake shoe of the package brake assembly against the tread surface of its corresponding wheel embodies a compression type of spring interposed between a casing and the exterior end of the piston rod of a floating brake cylinder device, the body of which brake cylinder device is operatively connected intermediate the ends of a brake head hanger that is pivoted on the casing. This compression type of spring, while fluid under pressure is released from the floating type of brake cylinder device of the package type brake assembly, is effective through the intermediary of the brake cylinder device and the hanger to bias the brake shoe carried by the brake head against the tread surface of the corresponding wheel with a chosen force whereby the friction between the brake shoe and the wheel generates sufficient heat to insure that the brake shoe and the wheel are warm enough to prevent the accumulation of ice and snow thereon during the time that a train is running with the brakes released.

In the accompanying drawings:

FIG. 2 is an enlarged vertical cross-sectional view showing certain details of the slack adjuster mechanism of FIG. 1.

FIG. 3 is an elevational view, partly in section, of a second embodiment of the invention embodying the brake-applying linkage and slack adjuster mechanism shown in FIGS. 1 and 2, but without the provision of a snow brake.

Description

Figure 1:
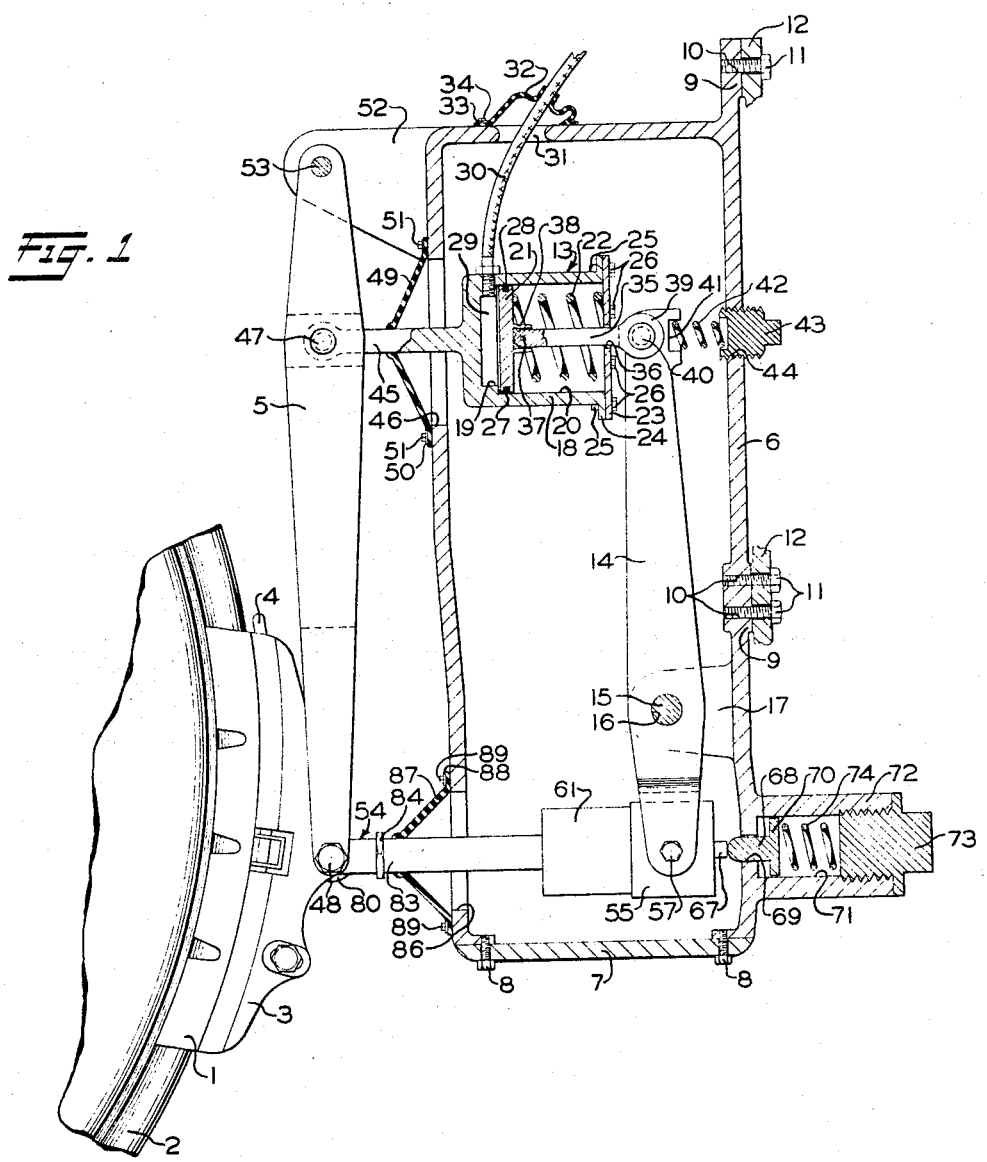
FIG. 1 is a vertical cross-sectional view of a brake assembly embodying the invention showing the brake-applying linkage containing a slack adjuster mechanism shown in outline and a spring 42 for constantly biasing a brake shoe against the tread surface of a corresponding wheel to provide a snow brake.

As shown in FIG. 1 of the drawings, a pneumatic brake assembly, one of which is provided for each wheel of a railway passenger car truck, is secured, as by several cap screws, to a pair of pads or mounting lugs formed integral with the side frame of the truck. This brake assembly comprises a brake shoe 1 for movement into braking contact with the tread of a wheel 2 of the car truck, a brake head 3 to which the brake shoe 1 is secured, as by a key 4, an external brake head hanger 5 bifurcated at one end, and a sectionalized casing comprising a main casing section 6 and a bottom cover 7 secured to the main casing section 6 by a plurality of cap screws 8, two of which appear in FIG. 1.

Formed integral with the main casing section 6 is a pair of bosses 9 provided with several spaced-apart threaded bores 10 for receiving a like number of cap screws 11 whereby the main casing section 6 is rigidly secured to a pair of pads or mounting lugs 12 formed integral with the side frame of a passenger car truck.

Arranged within the main casing section 6 is a floating brake cylinder device 13 and a brake-applying mechanism that includes a brake lever 14 bifurcated at one end and pivotally mounted intermediate its ends on a bolt 15 that extends through a bore 16 in the brake lever 14 and has its opposite ends anchored in coaxial bores formed in a pair of parallel spaced-apart brackets 17, only one of which appears in FIG. 1, formed integral with the right-hand wall of the main casing section 6.

The floating brake cylinder device 13 comprises a cup-shaped brake cylinder body 18 having two coaxial counterbores 19 and 20 of unequal diameter and a fluid pressure actuated brake-applying piston 21 slidably operable in the larger counterbore 20. A release spring 22 is interposed between the piston 21 and a nonpressure head 23 that is secured to an outturned flange 24 formed on the open end of the cup-shaped brake cylinder body 18 by a plurality of bolts 25 and nuts 26. The release spring 22 serves to yieldingly bias the piston 21 against a stop shoulder 27 formed by the left-hand end of the counterbore 20 and, through a linkage hereinafter described, the brake shoe 1 in a brake releasing direction toward a brake release position, in which position they are shown in FIG. 1.

The piston 21 is provided with a peripheral annular groove in which is disposed an O-ring 28 that forms a seal with the wall of the counterbore 20. A pressure chamber 29 is thus formed between the closed end of the cup-shaped brake cylinder body 18 and the piston 21, to which chamber fluid under pressure may be supplied through a flexible hose 30 that extends through an opening 31 formed in the top of the main casing section 6. The flexible hose 30 may be connected to the brake cylinder pipe of a brake control valve device of the usual air brake system on railway passenger cars. In order to prevent the entrance of water, ice and dirt to the interior of main casing section 6, a rubber boot 32 surrounds the opening 31 in the main casing section 6. The boot 32 is provided with an opening through which the flexible hose 30 extends and with beads formed around this opening, which beads fit around the hose 30. The boot 32 is secured to the top of the main casing section 6 by an annular plate 33 and a plurality of cap screws 34, only one of which appears in FIG. 1.

A piston rod 35 that extends through an opening 36 formed in the nonpressure head 23 into the chamber formed inside the main casing section 6 is pivotally connected at one end, as by a pin 37, to a central boss or sleeve 38 formed at one side of and integral with the piston 21. The opposite end of the piston rod 35 is provided with a clevis 39 between the opposite jaws of which are disposed the upper end of the brake lever 14 that is pivotally connected to the clevis 39 by a pin 40 and a cotter key (not shown).

The upper end of the brake lever 14 is provided with a recess 41 in which is disposed one end of a spring 42 that is interposed between the brake lever 14 and a screw-threaded plug 43 that has screw-threaded engagement with a screw-threaded bore 44 formed in the right-hand wall of the main casing section 6. The plug 43 may be adjusted to increase the compression on the spring 42 to press the brake shoe 1 against the tread surface of the wheel 2 with a light force corresponding to the amount that the spring 42 is compressed. This force of the spring 42 is transmitted to the shoe 1 through the upper end of the lever 14, pin 40, piston rod 35, piston 21, cup-shaped brake cylinder body 18, a rod 45 that is formed integral at one end with the closed end of the cup-shaped brake cylinder body 18 and extends through an opening 46 formed in the left-hand wall of the main casing section 6 to the exterior thereof where the exterior end is operatively connected to the brake head hanger 5 intermediate the ends thereof by a pin 47 and a cotter key (not shown), the hanger 5 and the brake head 3 connected to the lower bifurcated end of hanger 5 by a bolt 48 and a nut (not shown).

In order to prevent the entrance of water, ice and dirt to the interior of main casing section 6, a second rubber boot 49 surrounds the opening 46 in the main casing section 6. The boot 49 is similar in construction to the hereinbefore-mentioned boot in that it is provided with beads formed around an opening therein through which the rod 45 extends and is secured to the left-hand side of the main casing section 6 by an annular plate 50 and a plurality of cap screws 51, two of which appear in FIG. 1.

The upper end of the brake head hanger 5 is disposed between two spaced-apart parallel brackets 52, only one of which appears in FIG. 1, formed integral with the left-hand wall of the main casing section 6 and is pivotally connected to these brackets by a pin 53 that has its opposite end respectively anchored therein.

The bolt 48 that pivotally connects the lower bifurcated end of the brake head hanger 5 to the brake head 3 also pivotally connects one end of a brake rod 54 to this end of the brake head hanger 5 and the brake head 3. The brake rod 54 forms a part of a novel slack adjuster mechanism, which is shown in detail in FIG. 2 of the drawings and which will now be described in detail.

As shown in FIGS. 1 and 2 of the drawings, the novel slack adjuster mechanism of the present invention comprises a two-part housing including a first cup-shaped housing member 55 provided with two diametrically arranged screw-threaded counterbores 56, only one of which appears in FIG. 2, in which are respectively received two cap screws 57, only one of which appears in FIG. 1, that extend through corresponding coaxial bores formed in the lower bifurcated end of the brake lever 14. The first cup-shaped housing member 55 is provided with a bore 58, a first counterbore 59 and a second counterbore 60 which is of larger diameter and is provided with internal screw threads for receiving in screw-threaded engagement external screw threads formed on the right-hand end of a housing member 61 that constitutes the second member of the two-part housing.

The housing member 61 is provided with a bore 62 and two counterbores 63 and 64 that are coaxial with the bore 62, the counterbore 64 being of the same diameter as the counterbore 59 in the cup-shaped housing member 55.

As shown in FIG. 2, a cylindrical clutch member 65 is disposed in the counterbores 59 and 64 and is provided on the right-hand end thereof with a conical portion 66 having formed integral therewith a stem or nose piece 67 that extends through the bore 58 in the cup-shaped housing member 55 to the exterior thereof. As shown in FIG. 1, the end of the stem 67 contacts the end of a spring-biased plunger 68 that extends through a bore 69 formed in the right-hand wall of the main casing section 6. The plunger 68 is provided at its right-hand end with a collar 70 which is slidably disposed in a counterbore 71 that is coaxial with the bore 69 and is formed in a boss 72 that is integral with the right-hand wall of the main casing section 6. The right-hand end of the counterbore 71 is provided with internal screw threads that have screw-threaded engagement with a screw-threaded plug 73 between which and the collar 70 is interposed a spring 74 which is effective to bias the left-hand end of the plunger 68 into contact with the right-hand end of the stem or nose piece 67.

As shown in FIG. 2, the interior of the cylindrical cup-shaped member 55 has formed thereon, as by machining, between the right-hand end of the counterbore 59 and the left-hand end of the bore 58 therein, a conical surface 75 that is complementary to the conical portion 66 on the cylindrical clutch member 65 which is biased toward the conical surface 75 by a spring 76 that is weaker than the spring 74 and interposed between the left-hand end of the counterbore 63 and a spring seat member 77 between which and the cylindrical clutch member 65 is disposed a ball bearing assembly 78.

The left-hand end of the cylindrical clutch member 65 is provided with an internally screw-threaded counterbore 79, the threads of which form an angle of, for example, 30° with the horizontal, as shown in FIG. 2.

The brake rod 54 is made in two parts and comprises at its left-hand end a shackle 80 that is provided with an internally threaded counterbore 81 that has screw-threaded engagement with external screw threads formed on a portion 82 of reduced diameter located at the left-hand end of a rod 83. A lock nut 84 having screw-threaded engagement with the portion 82 of the rod 83 is tightened against the shackle 80 to rigidly lock the shackle 80 to the rod 83. The right-hand end of the rod 83 is provided with a collar 85 on which is formed external screw threads that are complementary to the internal screw threads formed in the counterbore 79 in the cylindrical clutch member 65 and are in screw-threaded engagement therewith.

As shown in FIG. 1, the brake rod 54 extends through an opening 86 in the left-hand wall of the main casing section 6 to the exterior thereof and is pivotally connected to the lower end of the brake head hanger 5 and the brake head 3 by the bolt 48, as hereinbefore mentioned. In order to prevent the entrance of water, ice and dirt to the interior of the main casing section 6, a rubber boot 87 surrounds the opening 86 in the main casing section 6. The boot 87 is provided with an opening through which the brake rod 54 extends and with beads formed around this opening, which beads fit around the brake rod 54. The boot 87 is secured to the left-hand side wall of the main casing section 6 by an annular plate 88 and a plurality of cap screws 89, two of which appear in FIG. 1.

*Operation—FIGS. 1 and 2*

Let it be assumed that pressure chamber 29 of the brake cylinder device 13 is devoid of fluid under pressure, and the release spring 22 within the brake cylinder device 13 has moved the brake cylinder body 18, the piston 21 and the brake-applying linkage or mechanism to a brake release position, as shown in FIG. 1. In this position, the spring 42 is effective to bias the brake lever 14 counterclockwise about the bolt 15 against the yielding resistance of the spring 74, to the position in which the lever 14 is shown in FIG. 1. Furthermore, the spring 42 is effective, through the intermediary of the upper end of the brake lever 14, pin 40, clevis 39, piston rod 35, piston 21, brake cylinder body 18, rod 45 that is integral with the body 18, and the pin 47, to exert a force on the brake head hanger 5 to bias it in a clockwise direction about the pin 53 so that the brake shoe 1, carried by the brake head 3 pivotally connected to the lower end of the hanger 5 by the bolt 48, is pressed against the tread surface of the corresponding wheel 2. Consequently, the brake shoe 1 is not moved away from the tread surface of the corresponding wheel 2 when a brake release is effected, but, on the other hand, it is pressed against the tread surface of the wheel 2 with a light force corresponding to the amount that the spring 42 is compressed by the plug 43 when it occupies the position in which it is shown in FIG. 1. The spring 42 is so designed that, while the plug 43 occupies the position in which it is shown in FIG. 1 relative to the main casing section 6, it is effective to bias the brake shoe 1 against the tread surface of its corresponding wheel 2 with a force that is adequate to generate, by the friction of the brake shoe 1 against the tread surface of its corresponding wheel 2, sufficient heat to maintain the brake shoe 1 and the outer peripheral portion of the wheel 2 at such a temperature as to prevent the accumulation of ice and snow as the result of rain and snow being deposited thereon as a train travels along a track during inclement weather. Consequently, the package brake assembly of the present invention, as a result of there being no accumulation of ice and snow thereon, will operate satisfactorily when a brake application is subsequently made.

In operation, when it is desired to effect a brake application, fluid under pressure is admitted to the pressure chamber 29 within the brake cylinder device 13 via the flexible hose 30, which is connected to the brake control valve device of the usual air brake system on railway cars. Fluid under pressure thus supplied to the pressure chamber 29, formed between the piston 21 and brake cylinder body 18, is effective to urge the piston 21 and piston rod 35 in the direction of the right hand against the yielding resistance of spring 22 to tend to rock the brake lever 14 clockwise about the bolt 15 against the yielding resistance of the spring 42, and to urge the brake cylinder body 18 and rod 45 that is integral therewith in the direction of the left hand to, through the intermediary of the bolt 47, tend to rock the brake head hanger 5 clockwise about the pin 53 that is carried by the brackets 52. Since the brake shoe 1 was pressed against the tread surface of the corresponding wheel 2 by the spring 42 prior to the admission of fluid under pressure to the pressure chamber 29, the brake head hanger 5 cannot be further rocked clockwise about the pin 53 by the fluid under pressure supplied to the pressure chamber 29. Therefore, the fluid under pressure acting on the piston 21 establishes a force that is transmitted through the piston rod 35, clevis 39 and pin 40 to the upper end of the brake lever 14. Since the brake lever 14 is pivotally mounted intermediate its ends on the bolt 15, the force thus applied to the upper end of the brake lever 14 is transmitted through the lever 14 and the two cap screws 57 to the cup-shaped housing member 55 and acts thereon in the direction of the left hand, as viewed in FIGS. 1 and 2. The force thus transmitted to the cup-shaped housing member 55 is effective to move this housing member 55 and the housing member 61, which has screw-threaded engagement with the housing 55, in the direction of the left hand, as viewed in FIGS. 1 and 2, until the conical surface 75 formed on the interior of the housing member 55 is moved into contact with the conical portion 66 formed on the right-hand end of the cylindrical clutch member 65. The threads of the internally screw-threaded counterbore 79 provided in the left-hand end of the cylindrical clutch member 65 engage the external screw threads formed on the collar 85 provided at the right-hand end of the rod 83 of brake rod 54, and the shackle 80 at the left-hand end of the brake rod 54 is pivotally connected to the brake head 3 and hanger 5 by the bolt 48. Therefore, the brake rod 54 cannot rotate on its longitudinal axis. Consequently, the force or thrust exerted on the cup-shaped member 55 and acting in the direction of the left hand, as viewed in FIGS. 1 and 2, is transmitted to the cylindrical clutch member 65 via the conical surface 75 and conical portion 66 and thence via the internal screw threads formed in the counterbore 79, the external screw threads formed on the collar 85, the rod 83, shackle 80, bolt 48, and brake head 3 to the brake shoe 1 to exert a corresponding force on the brake shoe 1 while contacting the tread surface of the wheel 2 to effect a braking action thereon.

As a braking force is thus transmitted to the brake head 3 and the brake shoe 1, it will be understood that these members are supported by the brake head hanger 5 which is suspended from the brackets 52 by the pin 53.

When it is desired to release the brake application, the fluid under pressure supplied to the pressure chamber 29 is vented in the usual way to atmosphere through the flexible hose 30 that connects the brake cylinder device 13 to the brake control valve device of the railway car brake system, whereupon, following the release of the force exerted on the brake shoe 1 through the brake rod 54 as the fluid under pressure is released from the pressure chamber 29, the spring 42 is rendered effective to maintain the brake shoe 1 in braking contact with the tread surface of the corresponding wheel 2 so that the brake shoe 1 is pressed against this tread surface with a force corresponding to the degree of compression of the spring 42 which is determined by the position of the screw-threaded plug 43 relative to the main casing section 6. It will be understood, of course, that this degree of compression is such that the brake shoe 1 is pressed against the tread surface of the wheel 2 with adequate force to insure that sufficient heat will be generated by the friction of the brake shoe 1 against the tread surface of its corresponding wheel 2 to maintain, while the brakes are released, the brake shoe 1 and the outer peripheral portion of the wheel 2 at such a temperature as to prevent the accumulation of ice and snow thereon in the coldest weather of the winter months.

Let it now be supposed that, due to repeated applications of the brakes, the brake shoe 1 is worn away an appreciable amount.

If, during a brake application, the brake shoe 1 wears away, the force or thrust transmitted from the piston 21 to the brake rod 54 via the piston rod 35, brake lever 14, housing member 55, and cylindrical clutch member 65, will maintain the brake shoe 1 against the tread surface of the corresponding wheel 2. Consequently, as the brake shoe 1 wears away while a brake application is in effect, the brake lever 14 will be rocked clockwise about the bolt 15 to effect movement of the housing member 55, cylindrical clutch member 65 and brake rod 54 in the direction of the left hand, as viewed in FIGS. 1 and 2. Likewise, the brake head hanger 5 will be rocked clockwise about the pin 53, since this hanger is pivotally connected to the brake head 3 and brake rod 54 by the bolt 48.

It will be noted from FIGS. 1 and 2 that as the housing member 55, cylindrical clutch member 65 and brake rod 54 are moved in the direction of the left hand, the spring 74 is rendered effective to move the collar 70 and the plunger 68 in the direction of the left hand, so that the left-hand end of the plunger 68 is maintained in contact with the right-hand end of the stem 67 which is an integral part of the cylindrical clutch member 65, as can be seen from FIG. 2.

Let it now be supposed that, subsequent to the occurrence of wear of the brake shoe 1 while a brake application is in effect, the brake application is released by venting fluid under pressure from the chamber 29 to atmosphere in the usual way through the flexible hose 30 and the brake control valve device of the railway car brake system. As fluid under pressure is thus released from the chamber 29 of the brake cylinder device 13, the fluid pressure force or thrust transmitted through the piston 21, piston rod 35, clevis 39, pin 40, brake lever 14, and cap screws 57 to the housing member 55 and acting thereon in the direction of the left hand, as viewed in FIGS. 1 and 2, is released and the release spring 22, together with the spring 42, are rendered effective to rock the brake lever 14 counterclockwise about the bolt 15. This counterclockwise rocking of the brake lever 14 is effective, through the intermediary of the cap screws 57, to move the housing members 55 and 61 in the direction of the right hand, as viewed in FIGS. 1 and 2. At this time, the spring 74 is effective to exert a force, through the intermediary of the collar 70, plunger 68 and stem 67, on the cylindrical clutch member 65, which force acts in the direction of the left hand, as viewed in FIGS. 1 and 2. Since the spring 74 is stronger than the spring 76, the force exerted by the spring 74 on the cylindrical clutch member 65 prevents this member from following the housing members 55 and 61 as they are moved in the direction of the right hand by the counterclockwise rocking of the brake lever 14 by the springs 22 and 42 in response to the release of fluid under pressure from the chamber 29, in the manner hereinbefore described. Consequently, as the housing members 55 and 61 are thus moved in the direction of the right hand by the counterclockwise rocking of the brake lever 14 about the bolt 15, the conical surface 75 formed on the interior of the housing member 55 will be moved away from the corresponding surface formed on the conical portion 66 of the cylindrical clutch member 65. Subsequent to this separation of the conical surface 75 from the conical portion 66 of the cylindrical clutch member 65, the force or thrust exerted on the housing members 55 and 61 in the direction of the right hand, by the above-mentioned counterclockwise rocking of the brake lever 14, is transmitted from the housing 61 through the spring 76, spring seat member 77, and ball bearing assembly 78 to the left-hand end of the cylindrical clutch member 65.

The strength of spring 42 is of such magnitude that it is effective to maintain the brake shoe 1 in contact with the tread surface of the corresponding wheel 2 as fluid under pressure is released from the chamber 29, in the manner hereinbefore described, and also subsequent to the release of fluid under pressure from the chamber 29. Since the brake rod 54 is pivotally connected to the brake head 3 and hanger 5 by the bolt 48, the brake rod 54 will be prevented from moving in the direction of the right hand when effecting a brake release by venting fluid under pressure from the chamber 29 to atmosphere, in the manner hereinbefore explained. Therefore, the force transmitted to the left-hand end of the cylindrical clutch member 65, in the manner explained above, is effective to cause this cylindrical clutch member to rotate on the collar 85 at the right-hand end of the now stationary brake rod 54, since the angle of the screw threads formed on this collar and the internal screw threads formed on the wall of the counterbore 79 in the cylindrical clutch member 65 is such as to provide for this rotation. These threaded members therefore provide that the cylindrical clutch member 65 can rotate on the collar 85 and move in the direction of the right hand, as viewed in FIGS. 1 and 2 of the drawings, to follow the housing members 55 and 61 which are being moved in the direction of the right hand in response to the counterclockwise rocking of the brake lever 14 described above. This rotation of the cylindrical clutch member 65 relative to the now stationary brake rod 54 and collar 85 carried thereby is effective to increase the distance between the bolt 48 and cap screw 57, shown in FIG. 1, or, in other words, to increase the effective length of the brake rod 54 in response to and in accordance with the wear of the brake shoe 1 occurring during the time the brake application was in effect so that the brake shoe 1 is always forced into braking contact with the corresponding wheel 2 by the spring 42, subsequent to effecting a brake release, with sufficient force to provide for the generation of the amount of heat necessary to produce a rise in the temperature of the brake shoe 1 and the peripheral portion of its corresponding wheel 2 to such a temperature as to prevent the accumulation of ice and snow thereon.

To replace a worn brake shoe 1 with a new brake shoe, a repairman will first apply a wrench to the head of the screw-threaded plug 43 and thereafter effect rotation of the plug 43 in the direction to reduce the tension of the spring 42 until this spring 42 no longer exerts a force on the upper end of the brake lever 14 to rock this lever counterclockwise, as viewed in FIG. 1, about the bolt 15. Consequently, the spring 42 is thus rendered ineffective to exert a force to press the brake shoe 1 against the tread surface of the wheel 1 via pin 40, piston rod 35, piston 21, brake cylinder body 18, rod 45, pin 47, brake head hanger 5, bolt 48, and brake head 3. Therefore, the repairman may now manually move the brake head 3 and brake shoe 1 carried thereby in a direction away from the tread surface of the wheel 2 to a position in which the worn-out brake shoe can be removed by withdrawing the key 4. Subsequent to removal of the worn-out brake shoe, a new brake shoe can be secured to the brake head 3 by means of the key 4, it being understood that the brake head 3 is in such a position that the new brake shoe can thus be secured thereto without the tread surface of the wheel 2 being in contact with the braking surface of the new brake shoe.

Subsequent to securing the new brake shoe to the brake head 3 by means of the key 4, the repairman will, by means of a wrench applied to the head of the screw-threaded plug 43, rotate the plug 43 in the direction to increase the tension of the spring 42 until this spring is effective, via the above-described linkage, to press the new brake shoe against the tread surface of the wheel 2 with a light force of such magnitude as to insure the generation of sufficient heat to prevent the accumulation of ice and snow thereon.

Description—FIG. 3

FIG. 3 of the drawings shows a second embodiment of a brake assembly comprising the invention. The brake assembly shown in FIG. 3 is substantially the same in construction as the brake assembly shown in FIGS. 1 and 2, except the snow brake is omitted.

The brake shoe shown in FIG. 3 is not constantly biased by a spring into braking contact with the tread surface of the corresponding wheel to generate, by the friction of the brake shoe against the tread surface of the wheel, sufficient heat to prevent the accumulation of ice and snow thereon.

The brake assembly shown in FIG. 3 comprises a brake actuating linkage that is identical in construction to the brake actuating linkage shown in FIGS. 1 and 2, except that, while the brakes are released, the brake lever of the brake actuating linkage is spring biased into contact with a stop formed integral with the main casing section.

Since the brake assembly shown in FIG. 3 is identical in construction, except as pointed out above, to the brake assembly shown in FIGS. 1 and 2, for convenience, corresponding parts of the two brake assemblies are identified by the same reference numerals without additional description.

In order to provide a stop for the brake lever 14, the brake assembly shown in FIG. 3 comprises a main casing section 90 that differs from the main casing section 6 in that the right-hand wall of the main casing section 90 has formed integral therewith a stop 91 against which, while the brakes are released, the brake lever 14 is biased by the spring 42 which, as in the first embodiment of the invention, is interposed between the upper end of the brake lever 14 and the screw-threaded plug 43. In this brake release position of the brake lever 14, the braking surface of the brake shoe 1 is disposed away from and out of contact with the tread surface of the corresponding wheel 2.

Operation

Let it be assumed that the pressure chamber 29 (FIG. 1) of the brake cylinder device 13 is devoid of fluid under pressure and the release spring 22 within the brake cylinder device 13 has moved the brake cylinder body 18 and piston 21 to the brake release position in which they are shown in FIG. 1. In this position, the spring 42 is effective to bias the brake-applying linkage that includes the brake lever 14 to the brake release position shown in FIG. 3, in which position the brake lever 14 is biased into contact with the stop 91. Therefore, while the brake lever 14 is biased against the stop 91, the spring 42 is not effective, through the intermediary of the upper end of the brake lever 14, pin 40, clevis 39, piston rod 35 (FIG. 1), piston 21, brake cylinder body 18, rod 45, and pin 47 to exert a force on the brake head hanger 5 to bias it clockwise about the pin 53. Consequently, the brake shoe 1 carried by the brake head 3 is not biased into braking contact with the tread surface of the wheel 2, but, on the other hand, while the brake lever 14 is biased into contact with the stop 91, is disposed out of contact with and away from this tread surface to its release position shown in FIG. 3.

In operation, when it is desired to effect a brake application, fluid under pressure is admitted to the pressure chamber 29 (FIG. 1) within the brake cylinder device 13 via the flexible hose 30 which is connected to the brake control valve device of the usual air brake system on railway cars. Fluid under pressure thus supplied to the chamber 29, formed between the piston 21 and brake cylinder body 18, is effective to move the brake cylinder body 18 and rod 45 that is integral therewith in the direction of the left hand to, through the intermediary of the bolt 47, effect rocking of the brake head hanger 5 clockwise about the pin 53 that is carried by the brackets 52.

As the brake cylinder body 18 and rod 45 are thus moved in the direction of the left hand, they are effective to rock the brake head hanger 5 clockwise about the pin 53 to thereby move the brake rod 54 and brake head 3 in the direction of the left hand, as viewed in FIG. 3, to bring the brake shoe 1 carried by the brake head 3 into braking contact with the tread surface of the wheel 2.

Since the spring 74 (FIG. 3) is stronger than the spring 76 (FIG. 2), the spring 74 is effective to normally bias the conical portion 66 of the cylindrical clutch member 65 (FIG. 2) out of contact with the conical surface 75 formed on the interior of the cup-shaped housing member 55. Therefore, as the brake head hanger 5 is rocked clockwise, as mentioned above, to move the brake rod 54 and brake head 3 in the direction of the left hand, this movement of the rod 83 and screw-threaded collar 85, which are parts of the brake rod 54, is effective to cause the cylindrical clutch member 65 to rotate on the collar 85. This rotation of the cylindrical clutch member 65 on the collar 85, which is prevented from rotating since the bolt 48 extends through the shackle 80, allows the brake rod 54 to move in the direction of the left hand and thereby increase the distance between the bolt 48 and cap screw 57 (FIG. 3) until the brake shoe 1 is brought into contact with the tread surface of the wheel 2.

The piston 21 and piston rod 35 (FIG. 1) are moved in the direction of the right hand by fluid under pressure supplied to the chamber 21, as hereinbefore mentioned, to rock the brake lever 14 (FIG. 3) clockwise about the bolt 15. Since the lower bifurcated end of the brake lever 14 is connected by the cap screws 57 to the cup-shaped member 55, this clockwise rocking of the brake lever 14 is effective to move the cup-shaped housing member 55 in the direction of the left hand, as viewed in FIGS. 2 and 3. Therefore, subsequent to the brake shoe 1 being moved into contact with the tread surface of the wheel 2, the fluid under pressure acting on the piston 21 establishes a force which is transmitted via the piston rod 35, pin 40, brake lever 14, and cap screws 57 to the cup-shaped housing member 55 to move this member in the direction of the left hand, as viewed in FIGS. 2 and 3, until the internal conical surface 75 thereon is moved into contact with the conical portion 66 of the cylindrical clutch member 65. Subsequent to the internal conical surface 75 formed on the cup-shaped housing member 55 being moved into contact with the conical portion 66 of the cylindrical clutch member 55, the fluid pressure force acting on the piston 21 and transmitted to the cup-shaped housing member 55, in the manner described above, is conveyed through the cylindrical clutch member 65 and the internal screw threads thereon, the collar 85 and the external screw threads thereon, the rod 83, shackle 80, bolt 48 and brake head 3 to the brake shoe 1 to exert a corresponding force on the brake shoe 1 to effect a braking action on the tread surface of the wheel 2.

As a braking force is thus conveyed to the brake head 3 and brake shoe 1, it will be understood that these members are supported by the brake head hanger 5 which is suspended from the brackets 52 by the pin 53.

When it is desired to release the brake application, fluid under pressure supplied to the pressure chamber 29 is vented to atmosphere, in the same manner as hereinbefore described in connection with the first embodiment of the invention, whereupon, following the release of fluid under pressure from the chamber 29 and the corresponding fluid pressure force exerted on the brake shoe 1 through the brake rod 54, the springs 22 (FIG. 1) and 42 (FIG. 3) return the brake linkage, including the brake lever 14, to the release position shown in FIG. 3.

Since the spring 74 (FIG. 3) is stronger than the spring 76 (FIG. 2), it will be understood that as the housing members 55 and 61 are moved in the direction of the right hand, as viewed in FIGS. 2 and 3, in response to the counterclockwise rocking of the brake lever 14 to its release position in which it abuts the stop 91, the housing member 61 compresses the spring 76 until it contacts the left-hand end of the spring seat member 77, and the internal conical surface 75 on the cup-shaped housing member 55 is moved out of contact with the conical portion 66 of the cylindrical clutch member 65. Subsequent to the internal conical surface 75 on the cup-shaped housing member 55 being moved out of contact with the conical portion 66 of the cylindrical clutch member 65, the now compressed spring 76 is rendered effective, through the intermediary of the spring seat member 77 and the ball bearing assembly 78, to exert a force or thrust on the cylindrical clutch member 65, which force acts in the direction of the right hand, as viewed in FIGS. 2 and 3. Since the internal conical surface 75 on the cup-shaped housing member 55 is now out of contact with the conical portion 66 of the cylindrical clutch member 65, the above-mentioned force acting on the cylindrical clutch member 65 in the direction of the right hand is effective to cause it to rotate on the collar 85 to thereby decrease the effective length of the brake rod 54 or the distance between the bolt 48 and the cap screws 57 (FIG. 3) to the original distance between this bolt and these cap screws as the brake lever 14 is rocked counterclockwise to its release position shown in FIG. 3, in which position it abuts the stop 91.

From the foregoing description of operation of the brake assembly shown in FIG. 3 of the drawings, it is apparent that, upon effecting a brake application, the effective length of the brake rod 54 is lengthened until the brake shoe 1 is brought into contact with the tread surface of the wheel 2. Likewise, it is apparent that, upon effecting a subsequent brake release, the effective length of the brake rod 54 is reduced and restored to its original value. Consequently, it will be apparent that, should brake shoe wear occur while a brake application is in effect, the effective length of the brake rod 54 is increased to compensate for this brake shoe wear upon effecting the next subsequent brake application, since the operation of the brake-applying linkage always increases the effective length of the brake rod 54 until the brake shoe 1 is brought into braking contact with the tread surface of the corresponding wheel 2. Therefore, a separate slack adjuster mechanism of the usual type is not required for the brake assembly shown in FIG. 3 of the drawings.

Having now described the invention, what I claim as new and desire to secure by Letters Patent is:

1. A brake assembly for a railway car truck wheel comprising, in combination:
 (a) a support means,
 (b) two levers respectively pivoted on said support means, one being pivotally mounted adjacent one end thereof and the other being pivotally mounted intermediate its ends,
 (c) a brake-shoe-carrying brake head operatively connected to said one pivoted lever adjacent the other end thereof,
 (d) fluid power means comprising:
  (i) a cylinder pivotally connected to said one pivoted lever intermediate the ends thereof, and
  (ii) a piston slidably mounted in said cylinder, said piston cooperating with said cylinder to form a chamber and having a stem pivoted at one end to said piston and at the opposite end to one end of the other of said pivoted levers,
 (e) spring means interposed between said support means and said one end of said other pivoted lever and effective in the absence of fluid under pressure in said chamber, via said stem, piston, cylinder and one lever, to constantly bias the brake shoe carried by said brake-shoe-carrying brake head into light braking contact with the tread surface of the corresponding railway car truck wheel, and
 (f) link means connecting said brake-shoe-carrying brake head to the other end of said other pivoted lever through which force is transmitted to said brake-shoe-carrying brake head from said other end of said other pivoted lever upon the supply of fluid under pressure to said chamber to effect movement of said piston and said stem to cause rocking of said other pivoted lever in a brake-applying direction about said support means, whereby relatively heavy braking force is transmitted from said piston to said brake-shoe-carrying brake head via said stem, other pivoted lever and link means.

2. A brake assembly for a railway car truck wheel as claimed in claim 1, further characterized in that said link means comprises:
 (a) a hollow casing operatively connected to said other end of said other pivoted lever,
 (b) a two-element clutch, one of which elements is integral with said hollow casing and formed on the interior thereof,
 (c) a screw member operatively connected to said brake-shoe-carrying brake head,
 (d) an internally threaded sleeve member in which said screw member is received, having formed at one end externally thereof the other element of said two-element clutch, said internally threaded sleeve member being rotatably mounted within said hollow casing,
 (e) a first biasing means interposed between said support means and said internally threaded sleeve member effective to move said other clutch element formed at said one end of said sleeve member out of engagement with said one clutch element integral with said hollow casing upon rocking of said other pivoted lever in a brake releasing direction, and
 (f) a second biasing means interposed between said hollow casing and said internally threaded sleeve member effective to exert an axial force on said sleeve member to cause rotation of said sleeve member relative to said screw member upon disengagement of said clutch elements by said first biasing means thereby to increase the effective length of said link means.

3. A brake assembly, as claimed in claim 1, further characterized in that said link means comprises:
  (a) a screw member operatively connected to said brake-shoe-carrying brake head,
  (b) a sleeve member having a threaded bore in which said screw member is received and having at one end a conical surface,
  (c) a tubular casing member pivotally connected to the other of said pivoted levers and having an internal surface complementary to said conical surface and when in contact therewith transmitting force from said other pivoted lever to said brake-shoe-carrying brake head via said three members,
  (d) a first biasing means for urging said conical surface in a direction toward said internal complementary surface and for effecting rotation of said sleeve member relative to said screw member upon disengagement of said surfaces, and
  (e) a second biasing means stronger than said first biasing means for urging said conical surface in a direction away from said internal complementary surface on said casing member whereby, upon the release of force transmitted to said casing member by said other pivoted lever, said sleeve member is rotated relative to said screw member by said first biasing means to increase the length of said link means.

4. A brake assembly for applying a braking force to a railway car truck wheel, said brake assembly comprising:
  (a) a casing fixed with respect to the frame of the car truck,
  (b) a first lever,
  (c) means pivotally connecting said first lever intermediate its ends to said casing,
  (d) a second lever,
  (e) means pivotally connecting one end of said second lever to said casing,
  (f) a brake head pivotally mounted on the other end of said second lever,
  (g) a brake shoe carried by said brake head,
  (h) slack adjuster means pivotally connecting one end of said first lever to said other end of said second lever, said slack adjuster means comprising:
    (i) a screw member operatively connected to said brake-shoe-carrying brake head,
    (ii) a sleeve member having a threaded bore in which said screw member is received and having at one end a conical surface,
    (iii) a tubular casing pivotally connected to said one end of said first lever and in which said internally threaded sleeve member is rotatably mounted, said tubular casing having an internal surface complementary to said conical surface and when in contact therewith transmitting force from said first lever to said brake head via said sleeve member and said screw member, and
    (iv) means normally biasing said conical surface out of frictional contact with said internal surface complementary thereto, and
  (i) fluid power means comprising:
    (i) a brake cylinder disposed within said casing and pivotally connected to said second lever intermediate the ends thereof,
    (ii) a piston slidably mounted in said cylinder and having a stem pivotally connected to the other end of said first lever, said piston and cylinder cooperating to form a chamber, and
    (iii) biasing means interposed between said piston and one end of said brake cylinder for normally biasing said piston against the other end of said brake cylinder and yieldingly resisting movement of said piston upon the supply of fluid under pressure to said chamber to effect movement of said cylinder and said piston in opposite directions to cause respective rocking of said first and said second levers in a brake-applying direction,
    (iv) said rocking of said second lever being effective to exert a thrust on said screw member to cause rotation of said internally threaded sleeve member relative thereto until said brake shoe contacts the wheel of the car truck, whereupon subsequent rocking of said first lever in said brake-applying direction moves said complementary internal surface on said tubular casing into clutching contact with said conical surface on said sleeve member to thereafter transmit a braking force to said brake shoe via said screw member, said sleeve member, and said brake head.

5. A brake assembly, as claimed in claim 4, further characterized in that the threads formed on said internally threaded sleeve member have an angle not exceeding a maximum angle of thirty degrees with the axis thereof.

6. A slack adjuster mechanism for a railway car wheel brake assembly having a linkage comprising two pivoted levers and a link connecting said levers, through which linkage a braking force is transmitted for pressing a brake shoe pivotally mounted on one of said levers into braking contact with the thread surface of the wheel, said slack adjuster mechanism constituting said link of said linkage and comprising:
  (a) a nonrotative screw member pivotally connected to said one lever of said linkage,
  (b) a two-member cone-type friction clutch comprising:
    (i) a first clutch member provided with a conical surface formed at one end and having an internally threaded counterbore extending inward from the opposite end, whereby said first clutch member is rotatably mounted on said nonrotative screw member, and
    (ii) a tubular casing enclosing said first clutch member and having at one end an inturned flange provided on one side with an internal surface complementary to said conical surface to constitute a second clutch member of said two-member cone-type friction clutch, said tubular casing being pivotally mounted on the second lever of said linkage and movable thereby, and
  (c) spring means normally biasing said first clutch member out of frictional contact with said second clutch member to provide for rotation of said first clutch member relative to said nonrotative screw member as wear on the brake shoe occurs while said one lever exerts a thrust on said screw member.

7. A brake assembly for applying a braking force to a railway car truck wheel, said brake assembly comprising:
  (a) a support means,
  (b) two spaced-apart levers, one of which is pivotally mounted adjacent one end thereof on said support means and the other of which is pivotally mounted intermediate its ends on said support means,
  (c) stop means carried by said support means for limiting rocking of said other pivoted lever in a brake releasing direction,
  (d) a brake-shoe-carrying brake head operatively connected to the other end of said one pivoted lever,
  (e) fluid power means comprising:
    (i) a cylinder pivotally connected to said one pivoted lever intermediate the ends thereof,
    (ii) a piston slidably mounted in said cylinder, said piston cooperating with said cylinder to form a chamber and having a stem pivoted at one end to said piston and at the opposite end to one end of said other pivoted lever, and
    (iii) first spring means interposed between said piston and one end of said cylinder effective in the absence of fluid under pressure in said chamber to bias said piston toward the opposite end of said cylinder, (f) link means connecting said brake-shoe-carrying brake head to the other end of said other pivoted lever and cooperating therewith and with said stem to transmit a force from said piston to said brake-shoe-carrying brake head subsequent to the supply of fluid under pressure to said chamber effecting via said cylinder, rocking of said one lever in a brake-applying direction through an angle sufficient to bring the brake shoe carried by said brake-shoe-carrying brake head into contact with the tread surface of the corresponding car truck wheel, and (g) second spring means interposed between said support means and said one end of said other pivoted lever effective upon the release of fluid under pressure from said chamber to rock said other pivoted lever into contact with said stop means, (h) said first spring means being effective via said piston and cylinder to rock said one pivoted lever in a direction to move said brake-shoe-carrying brake head carried thereby out of contact with the tread surface of said corresponding car wheel.

8. A brake assembly for applying a braking force to a railway car truck wheel, said brake assembly comprising:

(a) a support means, (b) two spaced-apart levers, one of which is pivotally mounted adjacent one end thereof on said support means and the other of which is pivotally mounted intermediate its ends on said support means, (c) a brake-shoe-carrying brake head operatively connected to the other end of said one pivoted lever, (d) fluid power means comprising:

(i) a cylinder pivotally connected to said one pivoted lever intermediate the ends thereof, (ii) a piston slidably mounted in said cylinder, said piston cooperating with said cylinder to form a chamber and having a stem pivoted at one end to said piston and at the opposite end to one end of said other pivoted lever, and (iii) spring means interposed between said piston and one end of said cylinder effective in the absence of the supply of fluid under pressure to said chamber to bias said piston toward the opposite end of said cylinder, and (e) link means connecting said brake-shoe-carrying brake head to the other end of said other pivoted lever and cooperating therewith and with said stem to transmit a relatively heavy braking force from said piston to said brake-shoe-carrying brake head upon the supply of fluid under pressure to said chamber effecting via said cylinder, rocking of said one lever in a brake-applying direction through an angle sufficient to bring the brake shoe carried by said brake-shoe-carrying brake head into contact with the tread surface of the corresponding car truck wheel.

9. A brake assembly for applying a braking force to a railway car truck wheel, said brake assembly comprising:

(a) a casing means, (b) a lever means pivoted intermediate its ends on said support means, (c) a brake-shoe-carrying brake head, (d) means for supporting said brake-shoe-carrying brake head, (e) a variable length link means connecting said brake-shoe-carrying brake head to one end of said lever means and effective to increase in length in response to wear of a brake shoe carried by said brake head, said variable length link means comprising:

(i) a screw member operatively connected to said brake-shoe-carrying brake head, (ii) a sleeve member having a threaded bore in which said screw member is received and having at one end a conical surface, (iii) means pivotally mounted on said lever means having an internal surface complementary to said conical surface and movable into engagement therewith upon rocking of said lever in a brake-applying direction, (iv) a first biasing means for urging said conical surface toward said internal complementary surface and for effecting rotation of said sleeve member relative to said screw member upon disengagement of said surfaces, and (v) a second biasing means stronger than said first biasing means for urging said conical surface in a direction away from said complementary internal surface whereby, upon rocking of said lever means in a brake releasing direction, said sleeve member is rotated relative to said screw member by said first biasing means to increase the length of said link means, (f) fluid pressure operated power means operatively connected to said lever means and said means for supporting said brake-shoe-carrying brake head and effective via said supporting means, to move said brake-shoe-carrying brake head into contact with a corresponding car truck wheel and to apply a force via said pivoted lever and said variable length link means to said brake head to force the brake shoe carried thereby into braking contact with the tread surface of the corresponding car truck wheel, and (g) means effective, via said power means, for supporting said brake-shoe-carrying brake head, pivoted lever, and said variable length link means upon the release of fluid under pressure from said power means, to move the brake shoe out of contact with the tread surface of said wheel.

10. A brake assembly for a railway car truck wheel, as claimed in claim 1, further characterized by means for varying the force exerted by said spring means.

11. A brake assembly for a railway car truck wheel, as claimed in claim 1, further characterized by means carried by said support means for varying the force exerted by said spring means.

References Cited by the Applicant
UNITED STATES PATENTS

| | | |
|---|---|---|
| 2,937,725 | 5/1960 | Newell. |
| 2,940,553 | 6/1960 | Newell et al. |
| 2,940,554 | 6/1960 | Cameron. |
| 2,973,840 | 3/1961 | Newell. |
| 2,973,841 | 3/1961 | McClure et al. |

DUANE A. REGER, *Primary Examiner.*